United States Patent [19]

Odomo

[11] Patent Number: 5,356,294
[45] Date of Patent: Oct. 18, 1994

[54] DENTAL DIAGNOSTIC AND INSTRUCTIONAL APPARATUS

[76] Inventor: Wataru Odomo, 18805 Cox Ave., #100, Saratoga, Calif. 95070-4182

[21] Appl. No.: 100,108
[22] Filed: Jul. 30, 1993
[51] Int. Cl.⁵ .............................................. G09B 23/28
[52] U.S. Cl. .................................... 434/263; 433/229
[58] Field of Search .............. 434/263, 262, 190, 73, 434/168; 433/68, 229

[56] References Cited

U.S. PATENT DOCUMENTS

| | | | |
|---|---|---|---|
| 242,821 | 6/1881 | Farmer | 446/263 |
| 707,810 | 8/1902 | Wenker | 446/263 |
| 1,168,949 | 1/1916 | McKittrick et al. | 446/137 |
| 1,458,782 | 6/1923 | Shapiro | 434/263 |
| 1,512,745 | 10/1924 | Carey, Jr. | 434/263 |
| 1,654,387 | 12/1927 | Stenz | 434/263 |
| 2,519,883 | 8/1950 | Bustanoby | 446/395 |
| 2,543,773 | 3/1951 | Goldschmidt | 433/189 |
| 2,616,174 | 11/1952 | Goldsmith | 433/189 |
| 2,674,802 | 4/1954 | Williams | 434/263 |
| 2,780,002 | 2/1957 | Shea et al. | 434/263 |
| 2,874,487 | 2/1959 | Bloom et al. | 434/263 |
| 3,093,919 | 6/1963 | Holtz | 40/142 |
| 3,740,854 | 6/1973 | Black | 434/263 |
| 4,135,315 | 1/1979 | McKee | 35/16 |
| 4,199,145 | 4/1980 | Gouraige, Jr. | 273/248 |
| 4,242,089 | 12/1980 | Sasaki | 433/189 |
| 4,250,642 | 2/1981 | Riehle | 40/160 |
| 4,693,686 | 9/1987 | Sendax | 433/173 |
| 4,902,229 | 2/1990 | Pedersen et al. | 434/80 |
| 5,244,394 | 9/1993 | Serabian-Musto | 434/263 |

FOREIGN PATENT DOCUMENTS

3621952A1 1/1988 Fed. Rep. of Germany .

Primary Examiner—John J. Wilson
Attorney, Agent, or Firm—Wells, St. John, Roberts, Gregory & Matkin

[57] ABSTRACT

A dental diagnostic and instructional apparatus includes a base member, a top sheet, and a plurality of movable magnetic devices. The top sheet includes a dental diagram relative to which the magnetic devices are positioned. The magnetic devices are preferably configured and dimensioned to be representative of teeth or other dental prothesis. The dental diagnostic and instructional apparatus enables a dentist to diagnose and instruct a patient concerning a dental condition and possible dental treatments. The dental diagnostic and instructional apparatus further enables records to be easily made to provide a comprehensive and progressive record of a patient's dental history.

12 Claims, 3 Drawing Sheets

DENTAL DIAGNOSTIC AND INSTRUCTIONAL APPARATUS

TECHNICAL FIELD

This invention relates to dental diagnostic and instructional devices used by dentists.

BACKGROUND OF THE INVENTION

For years, various devices and methods have been used by dentists to analyze and diagnose various dental conditions. These devices are also used to instruct the patients concerning dental conditions and the work needed to be performed to correct the particular dental conditions.

Traditional dental diagnostic and teaching devices have commonly been made in the form of three-dimensional objects. Some examples include a mold of a specific patient's set of teeth, or a three-dimensional block demonstrator holding a typical set of teeth. These three-dimensional devices are useful to provide a clear understanding to the patent and dentist of the condition of the teeth.

However, such three-dimensional dental diagnostic devices are difficult and burdensome to make. Such devices further cannot be modified to show changes in the dental condition of a particular patient. In the example of a mold, a subsequent mold would be required to show changes that have occurred in providing treatment to the patient's teeth. Additionally, these patient-specific devices cannot be used to model the teeth of various patients. Further, traditional three-dimensional dental diagnostic and instructional devices are bulky and therefore difficult to store for maintaining a full record of the particular patient's dental history.

Another traditional method for diagnosing and instructing a patient with regard to a dental condition is the use of x-ray photography. In combination with visually observing a dental condition of a particular patient's mouth, trained persons are capable of diagnosing and understanding dental conditions shown on x-rays. X-rays are, however, difficult for untrained persons to read and understand. X-rays include various extraneous lines and images that cloud a lay person's understanding of what is shown in the x-rays. Hence, x-rays are not the best way to explain a dental condition to a patient.

Accordingly, there is a need to provide a dental diagnostic device that is easy for a dentist or other dental professional to use, that presents a clear depiction of a dental condition which is easy for a patient to understand, that can be modified in a custom manner to show dental conditions of various patients, and that facilitates creation and maintenance of a full record of a patient's dental history. The following invention provides these advantages along with many other objects, features, and advantages that will become more apparent from the detailed description that follows.

BRIEF DESCRIPTION OF THE DRAWINGS

Preferred embodiments of the invention are described below with reference to the accompanying drawings, which are briefly described below.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The present invention relates to a dental diagnostic and instructional apparatus which comprises generally:
 a base member;
 a top sheet coupled to the base member, the top sheet including a dental diagram;
 a plurality of magnetic devices removably securable to the base member through the top sheet, the magnetic devices each comprising:
  a magnetic portion having a top surface and a bottom surface, the magnetic portion providing a magnetic force sufficient to support the weight of the respective magnetic device; and
  a face sheet attached to the magnetic portion, the face sheet including a dental diagram.

Figure 1:
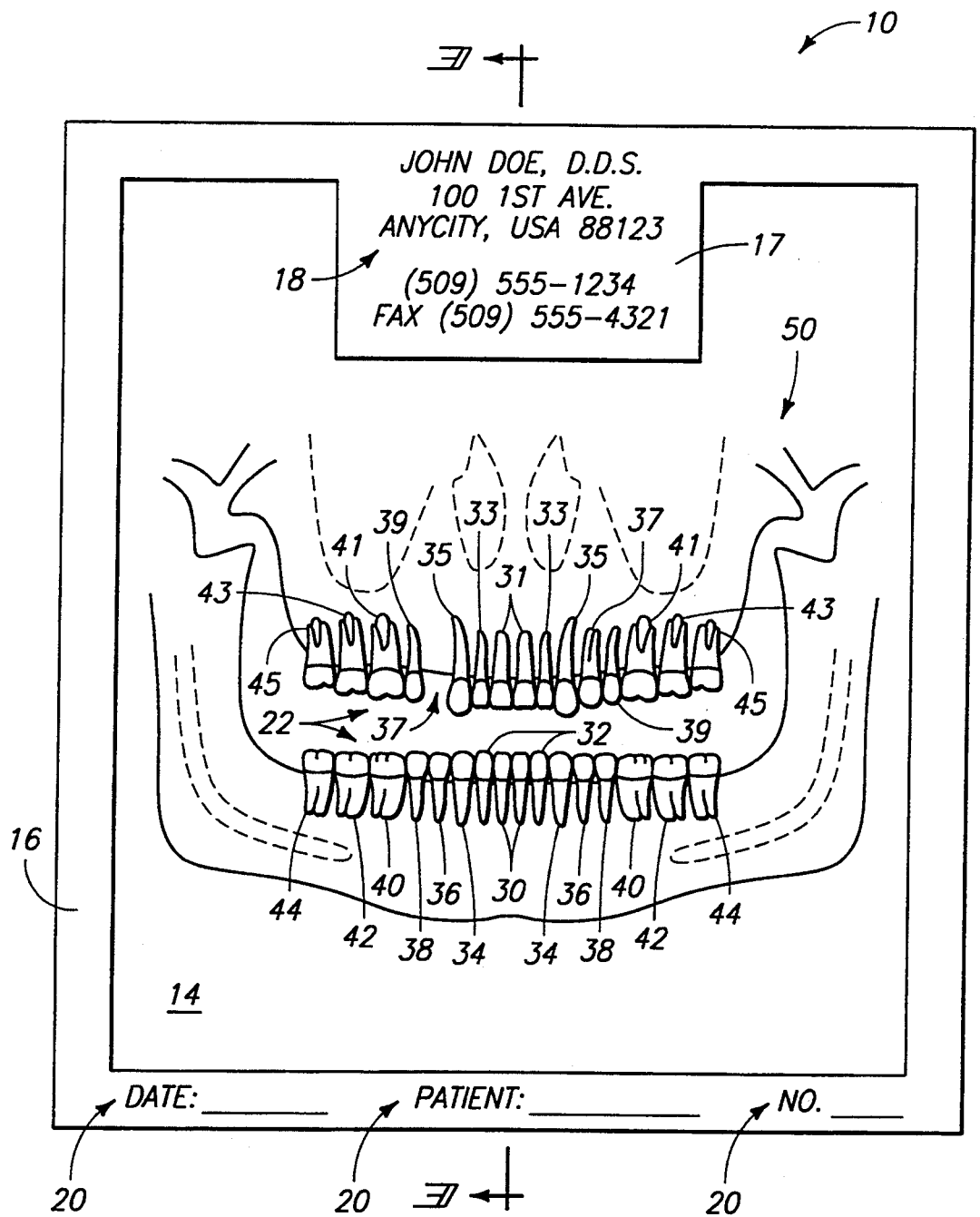
FIG. 1 is a first top plan view of a preferred embodiment of the dental diagnostic and instructional apparatus made according to the present invention including a plurality of magnetic devices configured to represent teeth.

More specifically with reference to FIG. 1, the present invention involves a dental diagnostic and instruction apparatus 10 which comprises a base member 12 (FIG. 3), a top sheet 14, a border 16, and a plurality of magnetic devices 22. The top sheet 14 includes a dental diagram 50 relative to which the various magnetic devices are positioned.

Figure 3:
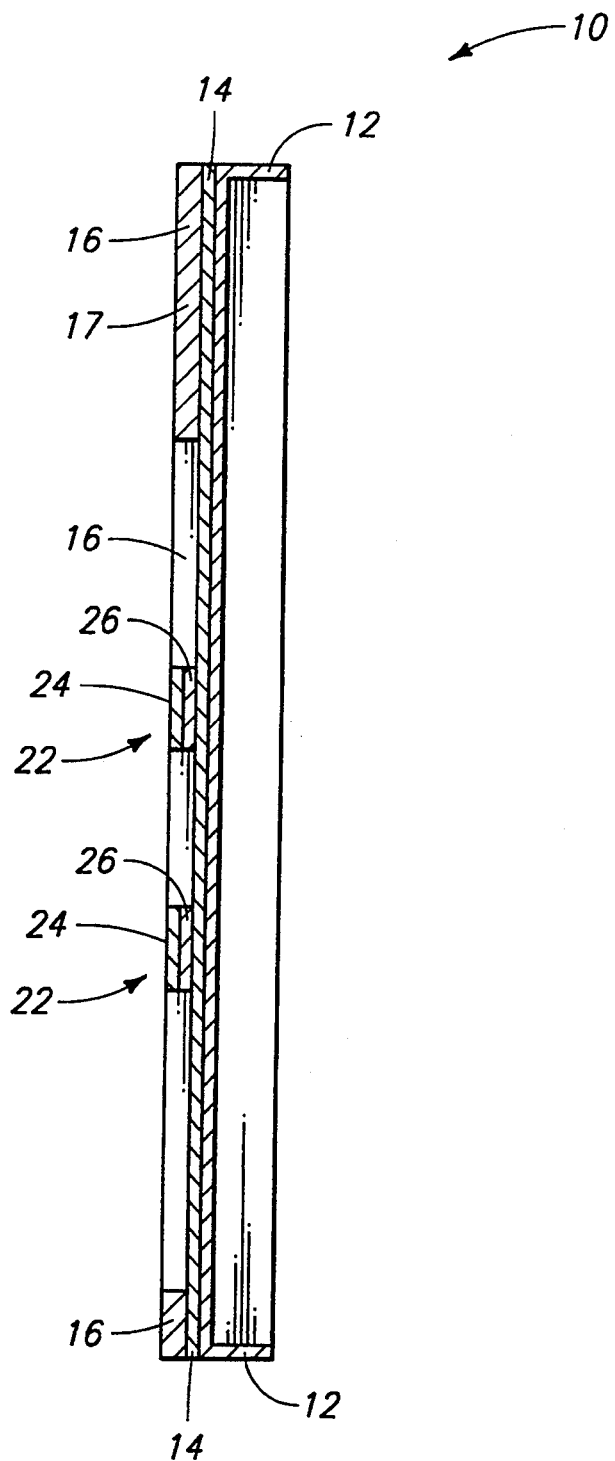
FIG. 3 is a sectional view taken along the line 3—3 of FIG. 1.

With reference to FIGS. 1 and 3, the movable magnetic devices 22 are configured and dimensionally scaled to represent teeth in two dimensions. A preferred dental diagnostic and instructional apparatus will include all of the teeth normally encountered in the mouth of a human being. The magnetic devices 22 shown in FIG. 1 represent the following typical teeth found in a human being (with the numbers in parenthesis corresponding to the Federation Dentaire International two-digit tooth-recording system): primary maxillary left and right central incisors 31 (Nos. 8 and 9), primary maxillary left and right lateral incisors 33 (Nos. 7 and 10), primary maxillary left and right cuspids 35 (Nos. 6 and 11), primary maxillary left bicuspid 35 (No. 12), primary maxillary left and right second bicuspids 39 (Nos. 4 and 13), primary maxillary left and right first molars 41 (Nos. 3 and 14), primary maxillary left and right second molars 43 (Nos. 2 and 15), and primary maxillary left and right third molars 45 (Nos. 1 and 16).

The teeth of the mandible are shown in FIG. 1 as follows: primary mandibular left and right central incisors 30 (Nos. 24 and 25), primary mandibular left and right lateral incisors 32 (Nos. 23 and 26), primary mandibular left and right cuspids 34 (Nos. 22 and 27), primary mandibular left and right first bicuspids 36 (Nos. 21 and 28), primary mandibular left and right second bicuspids 38 (Nos. 20 and 29), primary mandibular left and right first molars 40 (Nos. 19 and 30), primary mandibular left and right second molars 42 (Nos. 18 and 31), and primary mandibular left and right third molars 44 (Nos. 17 and 32).

In FIG. 1, there is a space showing a missing tooth (the primary maxillary right first bicuspid (No. 5)). Any number of dental conditions, including but not limited to horizontally impacted teeth, missing teeth, and proposed teeth replacements or teeth implants, can be demonstrated using the present invention. As such, the dental diagnostic and instructional apparatus enables teaching and demonstrating of practically an unlimited number of dental conditions and proposed dental work that may be performed on a patient.

With reference to FIG. 3, each magnetic device 22 comprises a magnetic portion 26 and a face sheet 24. The face sheets 24 preferably include a depiction of a tooth or other dental prosthesis. The magnetic devices 22 are configured to represent teeth or other dental prosthesis in a two-dimensional form. The magnetic portion 26 is attracted to the base member 12 and is securable thereto through the top sheet 14, which is secured, in turn, to the base member 12. The magnetic forces of the magnetic portions are sufficiently strong to support the weight of the respective magnetic devices so that, for example, the magnetic devices 22 will not move relative to the top sheet 14 when positioning the base member in an upside-down position.

Figure 2:
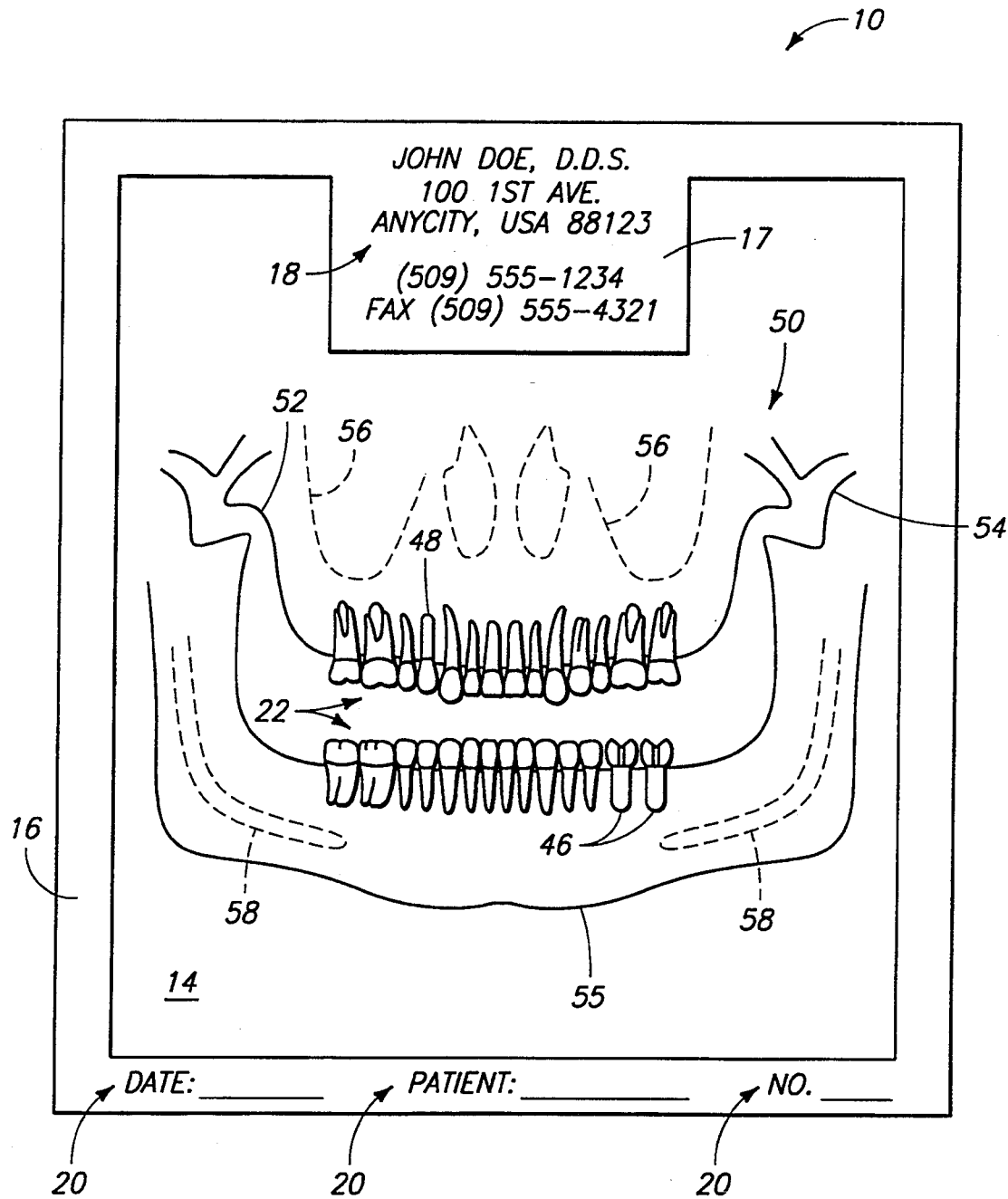
FIG. 2 is a second top plan view of the invention of FIG. 1 with the magnetic devices configured to represent both teeth and dental prothesis.

FIG. 2 shows the magnetic devices 22 to include two proposed implants 46 and a proposed single implant replacement 48. These dental prosthesis are only representative of the many different dental treatments that may be demonstrated using the present invention. Persons of skill in the art will understand the various other dental treatments that may be demonstrated.

Still referring to FIG. 2, the dental diagram 50 includes a plurality of lines which outline the form of a typical maxilla and mandible. Line 52 is representative of the inferior border of the maxilla, line 54 is representative of the superior line of the mandible, and line 55 is representative of the inferior border of the mandible. Dashed line 56 is representative of the inferior border of the sinus, and dashed line 58 is representative of the inferior alveolar nerve (the IA nerve). These representative lines are scaled as closely as reasonably possible to an average human being. By providing the referenced lines, particularly the dashed lines for the IA nerve and the border of the sinus, the dimensions and positioning of implants or other dental treatments can be illustrated.

FIGS. 2 and 3 further show a border extension 17 extending inwardly from the border 16 surrounding the dental diagram 50. The extension 17 includes indicia 18 in the form of dentist identification information to aid in creating and maintaining comprehensive and complete patient history files. Indicia for providing patient identification information is also included at the bottom of border 16. This indicia allows the particular patient's identification and information to be added to the dental diagnostic and instructional apparatus for record-keeping purposes.

A primary advantage of the present invention involves the versatility of the dental diagnostic and instructional apparatus. The dental devices 22 can be modified to correspond to the tooth configuration and arrangement of most any patient. In so doing, the magnetic devices 22 along with the dental diagram 50 provide a clear, concise manner of diagnosing, presenting, and instructing a patient as to dental conditions and potential dental treatments that may be utilized for remedying a dental condition.

Another primary advantage of the present invention is that multiple patient diagnoses and instructions can be accomplished using a single dental diagnostic and instructional apparatus. That is, the magnetic devices 22 can be rearranged on the top sheet 14 to show a number of different patients' dental conditions.

Yet another primary advantage of the invention is that it enables quick, accurate, easy-to-store records to be made for a patient's comprehensive and continuous dental history. FIG. 3 shows that the top surfaces of the magnetic devices (i.e., the top surface of the face sheet 24) lie substantially in a plane which corresponds to the top surface of the border 16. Accordingly, the dental diagnostic and instructional apparatus 10 can readily be turned upside down, and place on a photocopy machine for creating patient records. Such photocopy records are, of course, easily stored in the patient's file. Accordingly, the dental condition of the patient can be easily tracked as the dental treatment progresses. As indicated previously, the attractive forces between the magnetic portions 26 and the base member 12 are sufficient to prevent the magnetic devices 22 from moving relative to the top sheet 14 when the apparatus is placed on top of a copy machine.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A dental diagnostic and instructional apparatus, comprising:
    a base member;
    a top sheet coupled to the base member, the top sheet including a dental diagram;
    a plurality of magnetic devices removably disposed on the base member for slidable, translational movement relative to the base member to accurately position the magnetic devices about the dental diagram according to a patient's actual teeth configuration; the magnetic devices being securable to the base member through the top sheet, the magnetic devices each comprising:
        a magnetic portion having a top surface and a bottom surface, the magnetic portion providing a magnetic force sufficient to support the weight of the respective magnetic device; and
        a face sheet attached to the magnetic portion, the face sheet including a dental diagram.

2. A dental diagnostic and instructional apparatus according to claim 1, further comprising:
    a border surrounding the dental diagram of the top sheet;
    a border extension piece integral with and extending inwardly from the border, the border extension piece including indicia in the form of dentist identification information.

3. A dental diagnostic and instructional apparatus according to claim 1, further comprising a border surrounding the dental diagram of the top sheet, the border including indicia in the form of patient identification information.

4. A dental diagnostic and instructional apparatus according to claim 1, further comprising:

a border surrounding the dental diagram of the top sheet, the border including indicia in the form of patient identification information; and a border extension piece integral with and extending inwardly from the border, the border extension piece including indicia in the form of dentist identification information.

5. A dental diagnostic and instructional apparatus according to claim 4 wherein the border and the top sheet of the magnetic devices substantially lie in a common plane.

6. A dental diagnostic and instructional apparatus according to claim 1 wherein the magnetic devices are representative of teeth.

7. A dental diagnostic and instructional apparatus according to claim 1 wherein at least one of the magnetic devices is representative of dental prosthesis.

8. A dental diagnostic and instructional apparatus according to claim 1 wherein the magnetic devices are representative of teeth and dental prosthesis.

9. A dental diagnostic and instructional apparatus according to claim 1 wherein the base member is made of a ferrous material.

10. A dental diagnostic and instructional apparatus, comprising:

a base member;

a top sheet coupled to the base member, the top sheet including a dental diagram;

a border surrounding the dental diagram of the top sheet, the border including indicia in the form of patient identification information;

a border extension piece integral with and extending inwardly from the border, the border extension piece including indicia in the form of dentist identification information;

a plurality of magnetic devices removably disposed on the base member for slidable, translational movement relative to the base member to accurately position the magnetic devices about the dental diagram according to a patient's actual teeth configuration; the magnetic devices being securable to the base member through the top sheet, the magnetic devices being configured to represent teeth and dental prosthesis, the magnetic devices each comprising:

a magnetic portion having a top surface and a bottom surface, the magnetic portion providing a magnetic force sufficient to support the weight of the respective magnetic device; and a face sheet attached to the magnetic portion, the face sheet including a dental diagram.

11. A dental diagnostic and instructional apparatus according to claim 10 wherein the border and the top sheet of the magnetic devices substantially lie in a common plane.

12. A dental diagnostic and instructional apparatus according to claim 10 wherein the base member is made of a ferrous material.

* * * * *